United States Patent
Zhou et al.

(10) Patent No.: US 10,341,290 B2
(45) Date of Patent: Jul. 2, 2019

(54) METHOD AND SYSTEM FOR PRESENTING RECOMMENDATION INFORMATION

(71) Applicant: TENCENT TECHNOLOGY (SHENZHEN) COMPANY LIMITED, Shenzhen, Guangdong (CN)

(72) Inventors: Zhaojian Zhou, Shenzhen (CN); Wei Xu, Shenzhen (CN); Ang Xu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 646 days.

(21) Appl. No.: 14/880,037

(22) Filed: Oct. 9, 2015

(65) Prior Publication Data

US 2016/0036769 A1 Feb. 4, 2016

Related U.S. Application Data

(63) Continuation of application No. PCT/CN2014/074500, filed on Apr. 1, 2014.

(30) Foreign Application Priority Data

Apr. 12, 2013 (CN) .......................... 2013 1 0126152

(51) Int. Cl.
*G06F 15/16* (2006.01)
*H04L 29/12* (2006.01)
(Continued)

(52) U.S. Cl.
CPC ..... *H04L 61/2007* (2013.01); *G06Q 30/0282* (2013.01); *G06Q 30/0631* (2013.01); *H04L 61/2061* (2013.01); *H04L 61/609* (2013.01)

(58) Field of Classification Search
CPC ......... H04L 67/18; H04L 67/22; H04L 51/32; H04L 61/2007; H04L 61/2061;
(Continued)

(56) References Cited

U.S. PATENT DOCUMENTS 8,443,082 B2 * 5/2013 Nguyen ............... H04L 61/2575 709/225
9,852,155 B2 * 12/2017 Huang ............... G06F 17/30241
(Continued)

FOREIGN PATENT DOCUMENTS

CN 1722162 A 1/2006
CN 1817055 A 8/2006
(Continued)

OTHER PUBLICATIONS

International Preliminary Report and Written Opinion of the International Searching Authority for International Application No. PCT/CN2014/074500 dated Oct. 13, 2015, in 5 pages.
(Continued)

*Primary Examiner* — John B Walsh
(74) *Attorney, Agent, or Firm* — Knobbe Martens Olson & Bear LLP

(57) ABSTRACT

A method for presenting recommendation information includes: receiving a data obtaining request from a client terminal, recording a first address of the client terminal at this time and presenting corresponding recommendation information for the client terminal; receiving a response message sent from the client terminal after the client terminal has played the recommendation information, recording a second address of the client terminal at this time, and storing a corresponding relationship between the first address and the second address into an address data file; reading a specified address from a region address database which is corresponding to a specified region, and obtaining corresponding relationships each with the first address being the specified address from the address data file; in case of determining that the specified address has been converted via the corresponding relationships, not presenting recom-
(Continued)

mendation information corresponding to the specified region to the specified address.

17 Claims, 4 Drawing Sheets

(51) Int. Cl.
*G06Q 30/02* (2012.01)
*G06Q 30/06* (2012.01)

(58) Field of Classification Search
CPC ... H04L 61/2514; H04L 67/02; H04L 67/306; H04L 67/42; H04L 63/08; H04L 63/107; H04L 67/06; H04L 67/26; H04L 12/4608; H04L 2012/5615; H04L 2012/5645; H04L 61/609; G06Q 30/0631; G06Q 30/0282

See application file for complete search history.

(56) References Cited

U.S. PATENT DOCUMENTS

| | | | | |
|---|---|---|---|---|
| 2003/0167343 | A1* | 9/2003 | Furuno | H04L 29/06027 709/244 |
| 2006/0248160 | A1* | 11/2006 | Plummer | G06F 17/30899 709/217 |
| 2008/0313527 | A1 | 12/2008 | Chen | |
| 2009/0075675 | A1* | 3/2009 | Kim | H04W 64/00 455/456.2 |
| 2010/0280920 | A1 | 11/2010 | Scott et al. | |
| 2011/0060759 | A1* | 3/2011 | Fienblit | G06F 17/30575 707/770 |
| 2011/0209000 | A1* | 8/2011 | Hamman | H04L 29/12273 714/24 |
| 2014/0059018 | A1* | 2/2014 | Fienblit | G06F 17/30575 707/692 |

FOREIGN PATENT DOCUMENTS

| | | |
|---|---|---|
| CN | 101290642 A | 10/2008 |
| CN | 102414712 A | 4/2012 |
| CN | 102460417 A | 5/2012 |
| CN | 102957676 A | 3/2013 |
| WO | WO 2010/118115 A1 | 10/2010 |
| WO | WO 2014/166345 A1 | 10/2014 |

OTHER PUBLICATIONS

Office Action Issued in Chinese Application No. 201310126152.1 dated Sep. 14, 2017, 6 pages.

* cited by examiner

METHOD AND SYSTEM FOR PRESENTING RECOMMENDATION INFORMATION

CROSS REFERENCE

This application is continuation of international application No. PCT/CN2014/074500, filed on Apr. 1, 2014, which claims the benefit of Chinese Patent Application, No. 201310126152.1, filed on Apr. 12, 2013, the entire contents of which are hereby incorporated by reference.

BACKGROUND OF THE INVENTION

Field of the Invention

The present disclosure relates to information transmission technologies and more particularly to a method and system for presenting recommendation information.

Description of the Related Art

When a client terminal requests data from an information issue server, the information issue system can issue recommendation information to the client terminal according to the client terminal's address. The recommendation information can be recommendation information corresponding to a region where the client terminal's address belongs. For different regions, the information issue system can issue different recommendation information.

In order to monitor situations of the recommendation information issued by the information issue system, a third-party monitoring method is usually adopted to obtain situations of the issued recommendation information and the monitoring result can be used in maintenance work for following recommendation information issuing.

SUMMARY OF THE INVENTION

The present disclosure provides a method for presenting recommendation information, which can improve accuracy of monitoring results of a third-party monitoring system and can make statistical results of the third-party monitoring system tend to be consistent with recommendation information issued by an information issue system.

The present disclosure also provides a system for presenting recommendation information, which can improve the accuracy of monitoring results of a third-party monitoring system and can make statistical results of the third-party monitoring system tend to be consistent with recommendation information issued by an information issue system.

A method for presenting recommendation information includes: receiving a data obtaining request from a client terminal, recording an address of the client terminal at this time as a first address, and presenting recommendation information corresponding to a region where the first address belongs for the client terminal; receiving a response message sent from the client terminal after the client terminal has played the recommendation information, recording an address of the client terminal at this time as a second address, and storing a corresponding relationship between the first address and the second address into an address data file; reading a specified address from a region address database which is corresponding to a specified region, and obtaining corresponding relationships each with the first address being the specified address from the address data file; wherein each region corresponds to its own region address database which contains all addresses assigned to the corresponding region; in case of determining that the specified address has been converted via the obtained corresponding relationships, not presenting recommendation information corresponding to the specified region to the specified address when requesting data.

A system for presenting recommendation information includes an information issue server, a data collection server and an address analysis server; wherein the information issue server is configured to, receive a data obtaining request from a client terminal, record an address of the client terminal at this time as a first address, and present recommendation information corresponding to a region where the first address belongs for the client terminal; and receive a conversion notice from the address analysis server and not present recommendation information corresponding to a specified region for a specified address when requesting data; the data collection server is configured to, receive a response message sent from the client terminal after the client terminal has played the recommendation information, record an address of the client terminal at this time as a second address, and store a corresponding relationship between the first address and the second address into an address data file; the address analysis server is configured to, read the specified address from a region address database which is corresponding to the specified region, and obtain corresponding relationships each with the first address being the specified address from the address data file; each region corresponds to its own region address database which contains all addresses assigned to the corresponding region; in case of determining that the specified address has been converted via the obtained corresponding relationships, the address analysis server is further configured to send the conversion notice containing the specified address to the information issue server.

A method for presenting recommendation information includes: recording a client terminal's first address at which the client terminal sends a data obtaining request to an information issue system; recording the client terminal's second address at which the client terminal sends a response message to the information issue system after the client terminal receives recommendation information corresponding to a region where the first address belongs issued by the information issue system; storing a corresponding relationship between the first address and the second address into an address data file; reading a specified address from a region address database which is corresponding to a specified region, and obtaining corresponding relationships each with the first address being the specified address from the address data file; wherein each region corresponds to its own region address database which contains all addresses assigned to the corresponding region; judging whether the specified address has been converted through the obtained corresponding relationships; if determining that the specified address is converted, not presenting recommendation information corresponding to the specified region to the specified address during follow-up requesting data; if determining that the specified address is not converted, presenting the recommendation information corresponding to the specified region to the specified address during follow-up requesting data.

It can be seen from the above solution, the solution of one embodiment of the present disclosure includes analyzing to obtain addresses of client terminals affected by the intelligent routing, and not presenting corresponding recommendation information for these addresses when requesting data. In this way, a number of issued recommendation information calculated by the third-party monitoring system tends to be consistent with a number of recommendation information actually issued by the information issue system, and thus accuracy of a monitoring result of the third-party monitoring system can be improved.

DETAILED DESCRIPTION OF THE PREFERRED EMBODIMENT

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

For the method for presenting recommendation information, intelligent routing is usually provided in communication networks due to IP address shortage, with intelligent routing being able to convert IP addresses which have been assigned to users. Specifically, due to the impact of the intelligent routing, the client terminal's address, when the client terminal sends data obtaining requests, may be converted. This can cause a difference between the client terminal's address when the client terminal sends the data obtaining requests, and an address of the client terminal after the client terminal has played the recommendation information. Thus, a statistical result of a third-party monitoring system may be inconsistent with a number of the recommendation information actually issued by the information issue system, and then accuracy of the monitoring result of the third-party monitoring system can be reduced.

Figure 1:
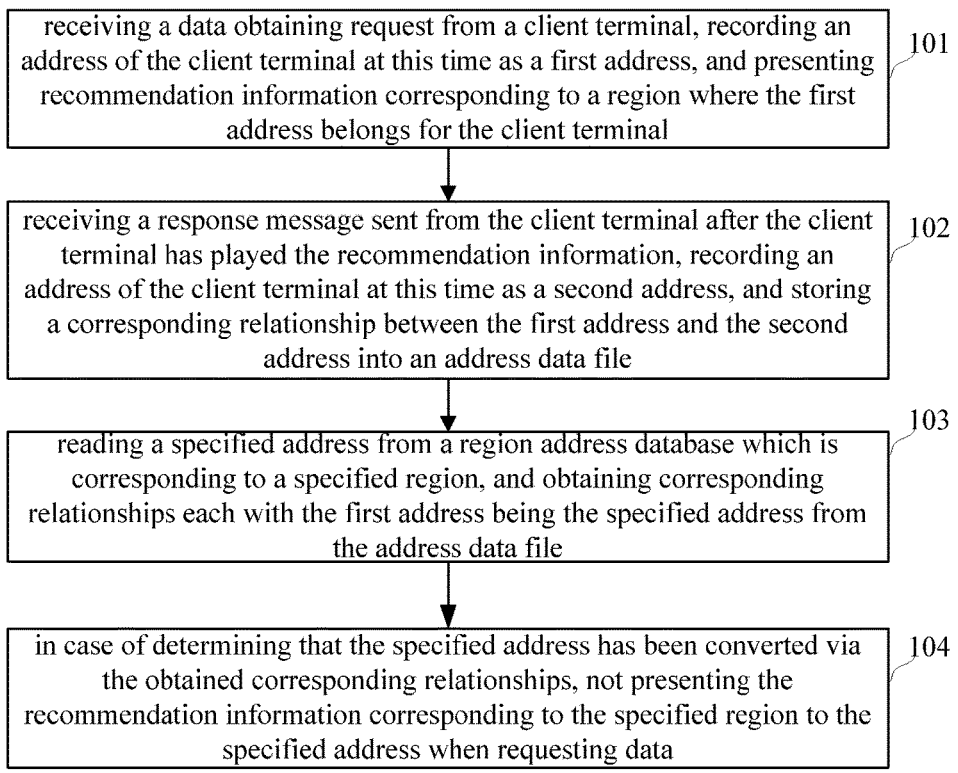
FIG. 1 is a schematic flow chart of a method for presenting recommendation information according to one embodiment of the present disclosure.

A solution of presenting recommendation information according to one embodiment of the present disclosure, includes analyzing to obtain addresses of client terminals affected by intelligent routing, and not presenting corresponding recommendation information for these addresses when requesting data. FIG. 1 is a schematic flow chart of a method for presenting recommendation information according to one embodiment of the present disclosure. Referring to FIG. 1, the method for presenting recommendation information includes following blocks.

Block 101: receiving a data obtaining request from a client terminal, recording an address of the client terminal at this time as a first address, and presenting recommendation information corresponding to a region where the first address belongs for the client terminal.

Each region corresponds to its own region address database which contains a plurality of addresses assigned to the each region. Each region has corresponding recommendation information which is associated with the each region. After an information issue system receives the data obtaining request, the information issue system presents the recommendation information corresponding to the region where the address of the client terminal belongs for the client terminal.

The recommendation information may be in a variety of forms; accordingly, the recommendation information may be presented for the client terminal in a variety of ways, which can be illustrated with following examples.

One example: besides displaying subject content provided by a background, a webpage also has vacant displaying positions for displaying the recommendation information; the recommendation information in this example can be text information or video data information; the presenting recommendation information corresponding to a region where the first address belongs for the client terminal in this block includes: extracting the recommendation information corresponding to the region where the first address belongs, inserting the recommendation information into the webpage and then sending the webpage with the recommendation information inserted therein to the client terminal to be presented.

Another example: the recommendation information in this example can be video clip information in a video streaming transmitted to the client terminal; the presenting recommendation information corresponding to a region where the first address belongs for the client terminal in this block includes: inserting the recommendation information into the video streaming and then sending the video streaming with the recommendation information inserted therein to the client terminal to be presented.

Block 102: receiving a response message sent from the client terminal after the client terminal has played the recommendation information, recording an address of the client terminal at this time as a second address, and storing a corresponding relationship between the first address and the second address into an address data file.

After the client terminal has played the recommendation information, the client terminal feeds back the response message to the information issue system. After receiving the response message, the information issue system records the address of the client terminal at this time as the second address and stores the corresponding relationship between the first address and the second address into the address data file. The corresponding relationship stored in the address data file can be used in a follow-up address conversion judgment.

Block 103: reading a specified address from a region address database that corresponds to a specified region, and obtaining corresponding relationships each with the first address being the specified address from the address data file.

Each region corresponds to its own region address database which contains all addresses assigned to the corresponding region.

Specifically, all corresponding relationships each with the first address being the specified address within a set period of time, can be obtained from the address data file. The set period of time, for example, can be the prior month.

Block 104: in case of determining that the specified address has been converted via the obtained corresponding relationships, not presenting the recommendation information corresponding to the specified region to the specified address when requesting data.

If determining that the specified address is not converted, the recommendation information corresponding to the specified region can be presented to the specified address when requesting data. In current actual applications, intelligent routing can usually be provided in communication networks due to IP address shortage; the intelligent routing can capture addresses of some client terminals within one region and convert the captured addresses for client terminals within other regions. In this disclosure, since a specific address may be affected by the intelligent routing, the address of the client terminal when the client terminal sends the data obtaining request may be captured and converted, causing a difference between the client terminal's address when the client terminal sends the data obtaining request and the address of the client terminal after the client terminal has played the recommendation information. This block extracts these addresses so as to not present the recommendation information corresponding to the regions where these addresses belong for these addresses during follow-up requesting data. In this way, a number of issued recommendation information calculated by the third-party monitoring system tends to be consistent with a number of recommendation information actually issued by the information issue system, and thus accuracy of a monitoring result of the third-party monitoring system can be improved. The reliability of performing follow-up maintenance work based on the monitoring result can also be improved.

The determining that the specified address has been converted via the obtained corresponding relationships of this block can be implemented in a variety of ways according to requirements which are illustrated hereinafter with examples.

One way: judging whether a number of times that the second address is not the specified address in the obtained corresponding relationships, is greater than a set number; if yes, determining that the specified address has been converted; otherwise, determining that the specified address is not converted. The set number can be, for example 10 times.

Another way: judging whether a number of days when the second address is not the specified address in the obtained corresponding relationships is greater than a set number of days; if the number of days when the second address is not the specified address in the obtained corresponding relationships is greater than the set number of days, judging whether a number of times that the second address is not the specified address in the obtained corresponding relationships, is greater than a set number; if yes, determining that the specified address has been converted; otherwise, determining that the specified address is not converted; if the number of days when the second address is not the specified address in the obtained corresponding relationships is not greater than the set number of days, determining that the specified address is not converted.

The set number of days can be, for example 5 days.

Still another way: judging whether a number of times that the second address is not the specified address in the obtained corresponding relationships, is greater than a set number; if the number of times that the second address is not the specified address in the obtained corresponding relationships is greater than a set number, judging whether a number of days when the second address is not the specified address in the obtained corresponding relationships is greater than a set number of days; if yes, determining that the specified address has been converted; otherwise, determining that the specified address is not converted; if the number of times that the second address is not the specified address in the obtained corresponding relationships is not greater than a set number, determining that the specified address is not converted.

In this block, when determining that the specified address has been converted via the obtained corresponding relationships, the method can further include: presenting recommendation information with no requirement of regions to the specified address during follow-up requesting data.

In actual implementations, after determining that the specified address has been converted, a conversion mark can be marked on a corresponding address in the corresponding region address database, or the corresponding address in the corresponding region address database can be deleted, so as to not present the recommendation information corresponding to the specified region for the address during a subsequent, or follow-up, request for data.

In the above process, after recording the address of the client terminal at this time as the first address, the block 101 can further include: feeding back the first address to the client terminal. Accordingly, the response message of the block 102 contains the first address. Further, the block 102 can obtain the first address via recording a client terminal identifier, which can specifically include:

the data obtaining request contains a client terminal identifier; after recording the address of the client terminal at this time as the first address in the block 101, the block 101 further includes: recording the client terminal identifier which is corresponding to the first address; the response message contains the client terminal identifier; after receiving the response message sent from the client terminal after the client terminal has played the recommendation information in the block 102, the block 102 further includes extracting the recorded first address corresponding to the client terminal identifier contained in the response message.

After the client terminal has played the recommendation information issued by the information issue system, the client terminal sends a feedback message containing the local address and a recommendation information identifier to the third-party monitoring system. For one region and one recommendation information identifier corresponding to the region, the third-party monitoring system calculates a number of times of presenting the recommendation information corresponding to the recommendation information identifier according to the feedback messages from the client terminal. Specifically, the number of times of presenting the recommendation information in this region can be obtained by extracting each feedback message containing one of addresses of the regions, and summing up times of the feedback messages each containing the recommendation information identifier.

Figure 2:
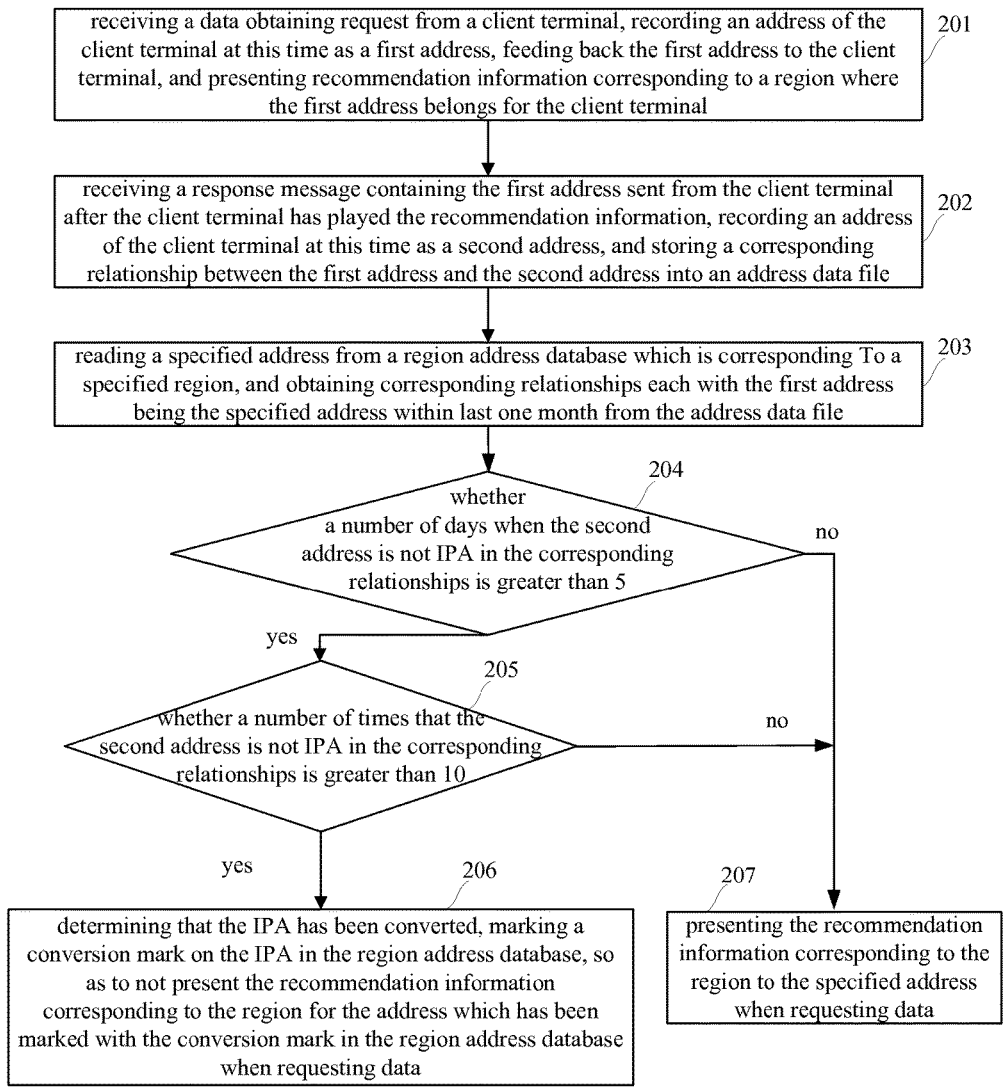
FIG. 2 is a schematic flow chart of an example of the method for presenting recommendation information according to one embodiment of the present disclosure.

FIG. 2 is a schematic flow chart of an example of the method for presenting recommendation information according to one embodiment of the present disclosure. Referring to FIG. 2, the method includes following blocks.

Block 201: receiving a data obtaining request from a client terminal, recording an address of the client terminal at this time as a first address, feeding back the first address to the client terminal, and presenting recommendation information corresponding to a region where the first address belongs for the client terminal.

Block 202: receiving a response message containing the first address sent from the client terminal after the client terminal has played the recommendation information, recording an address of the client terminal at this time as a second address, and storing a corresponding relationship between the first address and the second address into an address data file.

When the client terminal records the address, the client terminal can usually also record a corresponding time.

Block 203: reading a specified address from a region address database which is corresponding to a specified region, and obtaining corresponding relationships each with the first address being the specified address within last one month from the address data file.

Here, suppose the specified address is IPA, all corresponding relationships each with the first address being the IPA can be extracted.

Block 204: judging whether a number of days when the second address is not the IPA in the obtained corresponding relationships is greater than a set number of days; if yes, performing block 205; otherwise, performing block 207.

The set number of days can be for example 5 days; if a number of days when the second address is not the IPA in the obtained corresponding relationships is 6 days, then the block 205 is performed.

Block 205: judging whether a number of times that the second address is not the IPA in the obtained corresponding relationships is greater than a set number; if yes, performing block 206; otherwise, performing the block 207.

The set number can be for example 10 times. If the number of times that the second address is not the IPA in the obtained corresponding relationships is 12 times, then performing the block 206.

Block 206: determining that the IPA has been converted, marking a conversion mark on the IPA in the region address database, so as to not present the recommendation information corresponding to the region for the address which has been marked with the conversion mark in the region address database when requesting data.

Alternatively, after determining that the IPA has been converted, the IPA can be added into a blacklist; adopting the above manner, an address conversion judgment is performed for each address in the region address database one by one. When the client terminal requests data later, the recommendation information corresponding to the region is not presented to addresses in the blacklist.

Block 207: presenting the recommendation information corresponding to the region to the specified address when requesting data.

The recommendation information can be, for example, text notice information, video notice information, video notice information in a video streaming, and so on.

The solution of one embodiment of the present disclosure includes analyzing to obtain addresses of client terminals affected by the intelligent routing, and not presenting corresponding recommendation information for these addresses when requesting data. In this way, a number of issued recommendation information calculated by the third-party monitoring system tends to be consistent with a number of recommendation information actually issued by the information issue system, and thus accuracy of a monitoring result of the third-party monitoring system can be improved. The reliability of performing follow-up maintenance work based on the monitoring result can also be improved.

Figure 3:
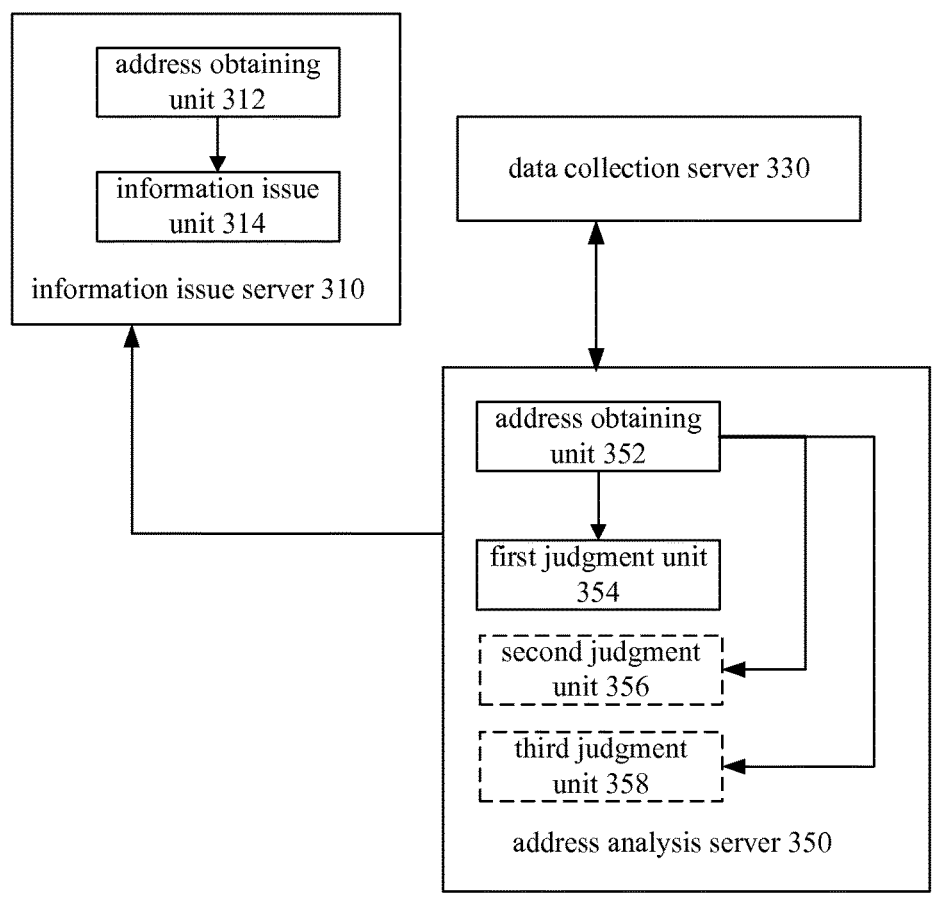
FIG. 3 is a schematic diagram of a system for presenting recommendation information according to one embodiment of the present disclosure.

FIG. 3 shows a schematic diagram of a system for presenting recommendation information according to one embodiment of the present disclosure. The system for presenting recommendation information is the above mentioned information issue system, and includes an information issue server 310, a data collection server 330 and an address analysis server 350.

The information issue server 310 is configured to, receive a data obtaining request from a client terminal, record an address of the client terminal at this time as a first address, and present recommendation information corresponding to a region where the first address belongs for the client terminal; and receive a conversion notice from the address analysis server 350, and not present the recommendation information corresponding to a specified region for a specified address during a follow-up requesting data.

The data collection server 330 is configured to, receive a response message sent from the client terminal after the client terminal has played the recommendation information, record an address of the client terminal at this time as a second address, and store a corresponding relationship between the first address and the second address into an address data file.

The address analysis server 350 is configured to, read the specified address from a region address database which is corresponding to the specified region, and obtain corresponding relationships each with the first address being the specified address from the address data file. Each region corresponds to its own region address database which contains all addresses assigned to the corresponding region. In case of determining that the specified address has been converted via the obtained corresponding relationships, the address analysis server 350 is further configured to send the conversion notice containing the specified address to the information issue server 310.

The information issue server 310 is further configured to, after receiving the conversion notice from the address analysis server 350, present recommendation information with no requirement of regions to the specified address during follow-up requesting data.

The address analysis server 350 includes an address obtaining unit 352 and a first judgment unit 354.

The address obtaining unit 352 is configured to read the specified address from the region address database which is corresponding to the specified region, and obtain corresponding relationships each with the first address being the specified address within a set period of time from the address data file, and send the read specified address to the first judgment unit 354.

The first judgment unit 354 is configured to judge whether a number of times that the second address is not the specified address in the obtained corresponding relationships is greater than a set number; if yes, send the conversion notice containing the specified address to the information issue server 310.

The address analysis server 350 further includes a second judgment unit 356.

The address obtaining unit 352 is further configured to read a specified address from the region address database which is corresponding to the specified region, and obtain corresponding relationships each with the first address being the specified address within a set period of time from the address data file, and send the read specified address to the second judgment unit 356.

The second judgment unit 356 is configured to, judge whether a number of days when the second address is not the specified address in the obtained corresponding relationships is greater than a set number of days, if yes, judge whether a number of times that the second address is not the specified address in the obtained corresponding relationships is greater than a set number; if yes, send the conversion notice containing the specified address to the information issue server 310.

The address analysis server 350 further includes a third judgment unit 358.

The address obtaining unit 352 is further configured to read a specified address from the region address database which is corresponding to the specified region, and obtain corresponding relationships each with the first address being the specified address within a set period of time from the address data file, and send the read specified address to the third judgment unit 358.

The third judgment unit 358 is configured to, judge whether a number of times that the second address is not the specified address in the obtained corresponding relationships is greater than a set number, if yes, judge whether a number of days when the second address is not the specified address in the obtained corresponding relationships is greater than a set number of days; if yes, send the conversion notice containing the specified address to the information issue server 310.

The information issue server 310 includes an address obtaining unit 312 and an information issue unit 314.

The address obtaining unit 312 is configured to receive the data obtaining request from the client terminal, record the address of the client terminal at this time as the first address, and send the first address to the information issue unit 314.

The information issue unit 314 is configured to, receive the first address from the address obtaining unit 312, extract recommendation information corresponding to the region where the first address belongs, insert the recommendation information into a webpage and send the webpage to the client terminal to be presented; or, insert the recommendation information into a video streaming and send the video streaming to the client terminal to be presented. The information issue unit 314 is further configured to receive the conversion notice from the address analysis server 350 and not present the recommendation information corresponding to the specified region for the specified address during follow-up requesting data.

The address obtaining unit 312 is configured to, after recording the address of the client terminal at this time as the first address, feed back the first address to the client terminal; the response message contains the first address.

The data obtaining request contains a client terminal identifier. The address obtaining unit 312 is further configured to, after recording the address of the client terminal at this time as the first address, record the client terminal identifier which is corresponding to the first address. The response message contains the client terminal identifier. After receiving the response message sent from the client terminal after the client terminal has played the recommendation information, the data collection server 330 is further configured to extract the recorded first address corresponding to the client terminal identifier contained in the response message.

Figure 4:
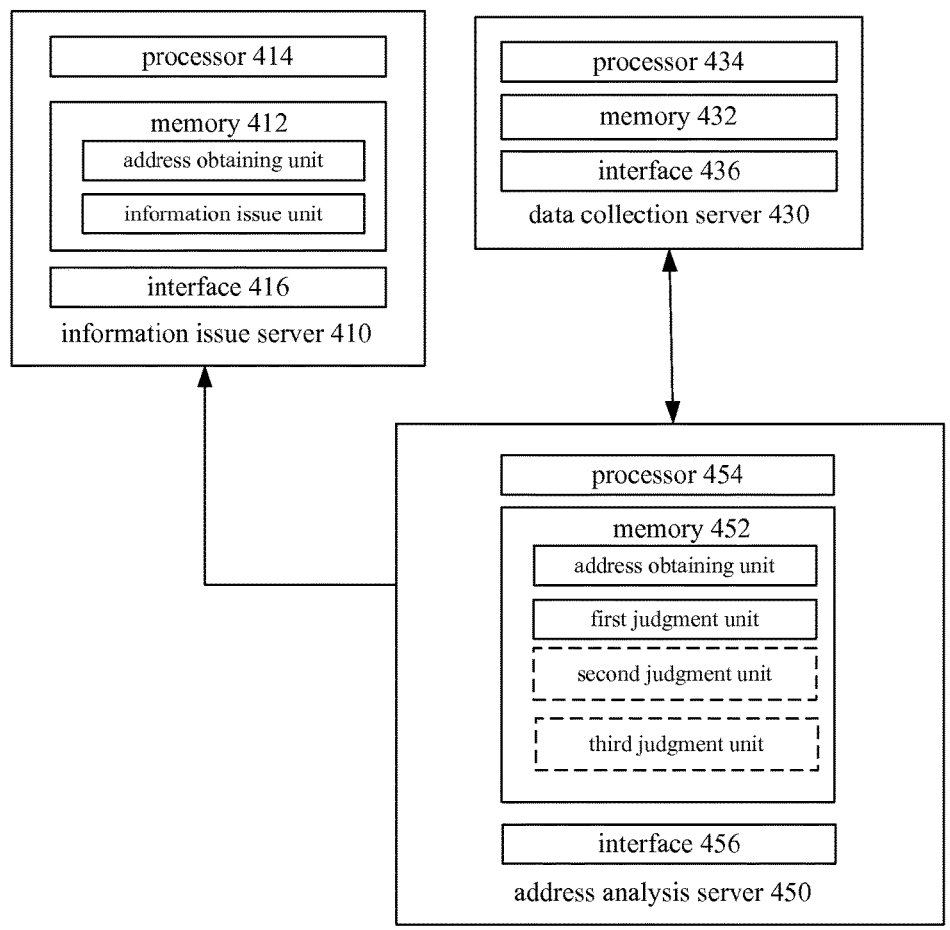
FIG. 4 is a schematic diagram showing a hardware structure of a system for presenting recommendation information according to one embodiment of the present disclosure.

With reference to FIG. 4, FIG. 4 is a schematic diagram showing a hardware structure of a system for presenting recommendation information according to one embodiment of the present disclosure. As shown in FIG. 4, the system may include an information issue server 410, a data collection server 430 and an address analysis server 450.

The information issue server 410 may include a memory 412, a processor 414 in communication with the memory 412, and an interface 416. The memory 412 is a non-transitory machine readable memory and is to store machine readable instructions (e.g. instruction codes) and various kinds of data. Machine readable instructions, shown as an address obtaining unit and an information issue unit and so on, may be stored in the memory 412. The processor 414 is to communication with the memory 412 to read and execute the machine readable instructions stored in the memory 412, so as to complete the functions completed by units in the above information issue server 310 such as the address obtaining unit 312 and the information issue unit 314. The interface 416 is to receive and send data.

The data collection server 430 may include a memory 432, a processor 434 in communication with the memory 432, and an interface 436. The memory 432 is a non-transitory machine readable memory and is to store machine readable instructions (e.g. instruction codes) and various kinds of data. The processor 434 is to communication with the memory 432 to read and execute the machine readable instructions stored in the memory 432, so as to complete the functions completed by the above data collection server 330. The interface 436 is to receive and send data.

The address analysis server 450 may include a memory 452, a processor 454 in communication with the memory 452, and an interface 456. The memory 452 is a non-transitory machine readable memory and is to store machine readable instructions (e.g. instruction codes) and various kinds of data. Machine readable instructions, shown as an address obtaining unit, a first judgment unit, a second judgment unit, and a third judgment unit and so on, may be stored in the memory 452. The processor 454 is to communication with the memory 452 to read and execute the machine readable instructions stored in the memory 452, so as to complete the functions completed by units in the above address analysis server 350 such as the address obtaining unit 352, the first judgment unit 354, the second judgment unit 356 and the third judgment unit 358. The interface 456 is to receive and send data.

The methods, units and systems described herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided to store instructions to cause a machine to execute a process as described according to examples herein. Specifically, a system or apparatus having a storage medium that stores machine-readable program codes for implementing functions of any of the above examples and that may cause the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. The program code may be downloaded from a server computer via a communication network.

It should be noted that, alternatively to the program codes being executed by a computer, at least part of the operations performed by the program codes may be implemented by an operation system running in a computer following instructions based on the program codes to implement any of the above examples.

In addition, the program codes implemented from a storage medium are written in a storage in an extension board inserted in the computer or in a storage in an extension unit connected to the computer. In this example, a CPU in the extension board or the extension unit executes at least part of the operations according to the instructions based on the program codes to implement any of the above examples.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for presenting recommendation information, comprising:
    receiving, by an information issue server, a data obtaining request from a client terminal, recording an address of the client terminal at this time as a first address, and presenting recommendation information corresponding to a region where the first address belongs for the client terminal;
    receiving, by a data collection server, a response message sent from the client terminal after the client terminal has played the recommendation information, recording an address of the client terminal at this time as a second address, and storing a corresponding relationship between the first address and the second address into an address data file, wherein after the client terminal has played the recommendation information, the client terminal sends a feedback message containing a recommendation information identifier to a third-party monitoring system, and the third-party monitoring system calculates a number of times of presenting the recommendation information corresponding to the recommendation information identifier according to the feedback message;
    reading, by an address analysis server, a specified address from a region address database which is corresponding to a specified region, and obtaining corresponding relationships each with the first address being the specified address from the address data file; wherein each region corresponds to its own region address database which contains all addresses assigned to the corresponding region; and
    when determining, by the address analysis server, via the obtained corresponding relationships that the specified address has been converted by intelligent routing, not presenting, by the information issue server, recommendation information corresponding to the specified region to the specified address when requesting data.

2. The method of claim 1, wherein when determining via the obtained corresponding relationships that the specified address has been converted by intelligent routing, the method further comprises: presenting, by the information issue server, recommendation information with no requirement of regions to the specified address when requesting data.

3. The method of claim 1, wherein the obtaining corresponding relationships each with the first address being the specified address from the address data file comprises:
    obtaining, by the address analysis server, corresponding relationships each with the first address being the specified address within a set period of time from the address data file;
    the determining via the obtained corresponding relationships that the specified address has been converted by intelligent routing comprises:
    judging, by the address analysis server, whether a number of times that the second address is not the specified address in the obtained corresponding relationships is greater than a set number; if yes, determining that the specified address has been converted; or,
    judging, by the address analysis server, whether a number of days when the second address is not the specified address in the obtained corresponding relationships is greater than a set number of days, if yes, judging whether a number of times that the second address is not the specified address in the obtained corresponding relationships is greater than a set number; if yes, determining that the specified address has been converted; or,
    judging, by the address analysis server, whether a number of times that the second address is not the specified address in the obtained corresponding relationships is greater than a set number, if yes, judging whether a number of days when the second address is not the specified address in the obtained corresponding relationships is greater than a set number of days; if yes, determining that the specified address has been converted.

4. The method of claim 1, wherein the presenting recommendation information corresponding to a region where the first address belongs for the client terminal comprises:
    extracting, by the information issue server, the recommendation information corresponding to the region where the first address belongs, inserting the recommendation information into a webpage and sending the webpage to the client terminal to be presented; or,
    inserting, by the information issue server, the recommendation information into a video streaming and sending the video streaming to the client terminal to be presented.

5. The method of claim 1, further comprising:
    feeding back, by the information issue server, the first address to the client terminal; wherein the response message contains the first address; or,
    recording, by the information issue server, a client terminal identifier which is corresponding to the first address, wherein the data obtaining request contains the client terminal identifier; and
    extracting, by the data collection server, the first address corresponding to the recorded client terminal identifier, wherein the response message contains the client terminal identifier.

6. The method of claim 1, wherein when determining via the obtained corresponding relationships that the specified address is converted by intelligent routing, the method further comprises:
    marking, by the address analysis server, a conversion mark on the specified address which is converted in the corresponding region address database; or deleting, by the address analysis server, the specified address which is converted in the corresponding region address database.

7. A system for presenting recommendation information, comprising:
an information issue server, configured to receive a data obtaining request from a client terminal, record an address of the client terminal at this time as a first address, and present recommendation information corresponding to a region where the first address belongs for the client terminal; and receive a conversion notice from the address analysis server and not present recommendation information corresponding to a specified region for a specified address when requesting data;
a data collection server, configured to receive a response message sent from the client terminal after the client terminal has played the recommendation information, record an address of the client terminal at this time as a second address, and store a corresponding relationship between the first address and the second address into an address data file, wherein after the client terminal has played the recommendation information, the client terminal sends a feedback message containing a recommendation information identifier to a third-party monitoring system, and the third-party monitoring system calculates a number of times of presenting the recommendation information corresponding to the recommendation information identifier according to the feedback message; and
an address analysis server, configured to read the specified address from a region address database which is corresponding to the specified region, and obtain corresponding relationships each with the first address being the specified address from the address data file; wherein each region corresponds to its own region address database which contains all addresses assigned to the corresponding region; wherein when determining via the obtained corresponding relationships that the specified address has been converted by intelligent routing, the address analysis server is further configured to send the conversion notice containing the specified address to the information issue server.

8. The system of claim 7, wherein the information issue server is further configured to, after receiving the conversion notice from the address analysis server, present recommendation information with no requirement of regions to the specified address when requesting data.

9. The system of claim 7, wherein the address analysis server comprises:
an address obtaining unit, configured to read the specified address from the region address database which is corresponding to the specified region, and obtain corresponding relationships each with the first address being the specified address within a set period of time from the address data file, and send the read specified address to a first judgment unit; and
the first judgment unit, configured to judge whether a number of times that the second address is not the specified address in the obtained corresponding relationships is greater than a set number; if yes, send the conversion notice containing the specified address to the information issue server.

10. The system of claim 7, wherein the address analysis server comprises:
an address obtaining unit, configured to read the specified address from the region address database which is corresponding to the specified region, and obtain corresponding relationships each with the first address being the specified address within a set period of time from the address data file, and send the read specified address to a second judgment unit; and
the second judgment unit, configured to judge whether a number of days when the second address is not the specified address in the obtained corresponding relationships is greater than a set number of days, if yes, judge whether a number of times that the second address is not the specified address in the obtained corresponding relationships is greater than a set number; if yes, send the conversion notice containing the specified address to the information issue server.

11. The system of claim 7, wherein the address analysis server comprises:
an address obtaining unit, configured to read the specified address from the region address database which is corresponding to the specified region, and obtain corresponding relationships each with the first address being the specified address within a set period of time from the address data file, and send the read specified address to a third judgment unit; and
the third judgment unit, configured to judge whether a number of times that the second address is not the specified address in the obtained corresponding relationships is greater than a set number, if yes, judge whether a number of days when the second address is not the specified address in the obtained corresponding relationships is greater than a set number of days; if yes, send the conversion notice containing the specified address to the information issue server.

12. The system of claim 7, wherein the information issue server comprises:
an address obtaining unit, configured to receive the data obtaining request from the client terminal, record the address of the client terminal at this time as the first address, and send the first address to an information issue unit; and
the information issue unit, configured to, receive the first address from the address obtaining unit, extract the recommendation information corresponding to the region where the first address belongs, insert the recommendation information into a webpage and send the webpage to the client terminal to be presented; or, insert the recommendation information into a video streaming and send the video streaming to the client terminal to be presented; wherein the information issue unit is further configured to receive the conversion notice from the address analysis server and not present the recommendation information corresponding to the region for the specified address during follow-up requesting data.

13. The system of claim 12, wherein the address obtaining unit is configured to feed back the first address to the client terminal; wherein the response message contains the first address; or,
the data obtaining request contains a client terminal identifier; the address obtaining unit is further configured to record the client terminal identifier which is corresponding to the first address; the response message contains the client terminal identifier; the data collection server is further configured to extract the recorded first address corresponding to the client terminal identifier contained in the response message.

14. The system of claim 7, wherein the address analysis server is further configured to, when determining via the obtained corresponding relationships that the specified address has been converted by intelligent routing, mark a conversion mark on the specified address in the corresponding region address database; or, delete the specified address in the corresponding region address database.

15. A method for presenting recommendation information, comprising:

recording, by an information issue server, a client terminal's first address at which the client terminal sends a data obtaining request to the information issue server;

recording, by a data collection server, the client terminal's second address at which the client terminal sends a response message to the data collection server, after the client terminal has played recommendation information which is issued by the information issue server and corresponding to a region where the first address belongs, wherein after the client terminal has played the recommendation information, the client terminal sends a feedback message containing a recommendation information identifier to a third-party monitoring system, and the third-party monitoring system calculates a number of times of presenting the recommendation information corresponding to the recommendation information identifier according to the feedback message;

storing, by the data collection server, a corresponding relationship between the first address and the second address into an address data file;

reading, by an address analysis server, a specified address from a region address database which is corresponding to a specified region, and obtaining corresponding relationships each with the first address being the specified address from the address data file; wherein each region corresponds to its own region address database which contains all addresses assigned to the corresponding region; and judging, by the address analysis server, through the obtained corresponding relationships whether the specified address has been converted by intelligent routing;

if determining that the specified address is converted, not presenting, by the information issue server, recommendation information corresponding to the specified region to the specified address during follow-up requesting data;

if determining that the specified address is not converted, presenting, by the information issue server, the recommendation information corresponding to the specified region to the specified address during follow-up requesting data.

16. The method of claim 15, wherein when determining that the specified address is converted, the method further comprises: presenting, by the information issue server, recommendation information with no requirement of regions to the specified address during follow-up requesting data.

17. The method of claim 15, wherein the judging through the obtained corresponding relationships whether the specified address has been converted by intelligent routing comprises:

judging, by the address analysis server, whether a number of times that the second address is not the specified address in the obtained corresponding relationships is greater than a set number; if yes, determining that the specified address is converted, if not, determining that the specified address is not converted; or, judging, by the address analysis server, whether a number of days when the second address is not the specified address in the obtained corresponding relationships is greater than a set number of days, if yes, judging whether a number of times that the second address is not the specified address in the obtained corresponding relationships is greater than a set number; if yes, determining that the specified address is converted, if not, determining that the specified address is not converted; or, judging, by the address analysis server, whether a number of times that the second address is not the specified address in the obtained corresponding relationships is greater than a set number, if yes, judging whether a number of days when the second address is not the specified address in the obtained corresponding relationships is greater than a set number of days; if yes, determining that the specified address is converted, if not, determining that the specified address is not converted.

* * * * *

UNITED STATES PATENT AND TRADEMARK OFFICE
CERTIFICATE OF CORRECTION

PATENT NO. : 10,341,290 B2  
APPLICATION NO. : 14/880037  
DATED : July 2, 2019  
INVENTOR(S) : Zhaojian Zhou Page 1 of 1

It is certified that error appears in the above-identified patent and that said Letters Patent is hereby corrected as shown below:

In the Drawings

In Sheet 2 of 4, Fig. 2, Reference No. 203, Line 1, delete "To" and insert --to--.

Signed and Sealed this  
Twenty-first Day of January, 2020

Andrei Iancu  
*Director of the United States Patent and Trademark Office*